United States Patent

[11] 3,599,109

| [72] | Inventors | Howard J. Guggenheim<br>Somerville;<br>Leo F. Johnson, Bedminister, both of, N.J. |
|---|---|---|
| [21] | Appl. No. | 816,734 |
| [22] | Filed | Apr. 16, 1969 |
| [45] | Patented | Aug. 10, 1971 |
| [73] | Assignee | Bell Telephone Laboratories Incorporated<br>Murray Hill, N.J. |

[54] SECOND PHOTON VISIBLE EMITTING PHOSPHOR AND DEVICE UTILIZING SAME
11 Claims, 3 Drawing Figs.

[52] U.S. Cl. ............................................ 331/94.5,
250/71, 252/301.4
[51] Int. Cl. ............................................ H01s 3/16
[50] Field of Search ........................... 331/94.5;
250/71, 80; 252/301.4

[56] References Cited
UNITED STATES PATENTS

| 3,380,926 | 4/1968 | Harper ................... | 161/170 |
| 3,480,877 | 11/1969 | Dillon, Jr. et al. ........... | 331/94.5 |
| 3,495,893 | 2/1970 | Geusic et al. ................. | 350/160 |

*Primary Examiner* — Ronald L. Wibert
*Assistant Examiner* — Edward S. Bauer
*Attorneys* — R. J. Guenther and Edwin B. Cave ABSTRACT: Light output in the visible spectrum results from up conversion of infrared radiation within a composition illustrated by erbium-doped $BaYbF_5$. The composition may be used as a coating on an infrared-emitting GaAs diode.

PATENTED AUG 10 1971

INVENTORS H. J. GUGGENHEIM
L. F. JOHNSON
BY
George S. Indig
ATTORNEY

SECOND PHOTON VISIBLE EMITTING PHOSPHOR AND DEVICE UTILIZING SAME

BACKGROUND OF THE INVENTION

1. Field of the Invention

The invention is concerned with visible light sources either coherent or incoherent. In either event, such devices are electrically energized either directly or indirectly.

2. Description of the Prior Art

Two distinct types of prior art are relevant. The first is concerned with electroluminescent (incoherent) visible light sources. The other is concerned with lasers.

a. Visible light-emitting electroluminescent devices presently under investigation take many forms. A particularly promising category utilizes a forward biased PN semiconductor junction. This category includes diodes which are primarily gallium phosphide but contain dopings of various materials to tailor the wavelength of resulting radiation. Recently, such a diode operating at a red wavelength at an efficiency of 3.4 percent was reported, see I. Ladany, Electro-Chemical Society Meeting, Montreal, Oct. 11, 1968, Paper 610, RNP.

More recently, a different type of diode device based on the use of the far more efficient GaAs diode was described, see S. V. Galginaitis et al., International Conference of GaAs Dallas, Oct. 17, 1968, "Spontaneous Emission Paper No. 2." GaAs, while far more efficient than GaP, emits in the infrared spectrum, and the reported visible light device depends upon an up-converting phosphor coating. This coating, which is believed to convert by means of a two photon process, is dependent upon an ytterbium ($Yb^{3+}$) sensitizer ion and an erbium ($Er^{3+}$) activator ion. The phosphor host is lanthanum fluoride ($LaF_3$).

While the reported device has excited considerable interest, its efficiency is considerably lower than that of the best GaP devices.

b. The several years of laser development following the first successful demonstration of this first coherent light source has produced a vast array of devices. Many of these devices operate continuously (CW) at frequencies distributed through the visible and infrared spectra. By far, the greatest flexibility in available continuous output is afforded by the various types of gaseous lasers, however; and progress in the development of solid-state devices, particularly in recent years, has been somewhat limited.

There are, at the present time, only a very small number of fundamental types of solid-state lasers. Of the optically pumped variety, for example, only trivalent neodymium-containing devices are commonly available for CW use. A few other systems have been made to operate on a laboratory scale. A study of the pertinent literature references describes no such devices operating CW at visible wavelengths shorter than those within the red spectrum.

SUMMARY OF THE INVENTION

The invention arises from the observation that any of a series of novel compositions containing $Yb^{3+}$ is capable of efficiently up-converting infrared radiation to wavelengths in the visible spectrum. The activator ion, like that in the device reported in the preceding section, may be $Er^{3+}$ although $Ho^{3+}$ may be present as an adjunct or replacement.

An exemplary composition in accordance with the invention is erbium-doped material which may be represented by the formula $BaYbF_5$ although, as described in the detailed description, a considerable range of compositions as well as certain substitutions and additions is permitted.

A particularly useful form of the invention is an electroluminescent device similar to that described under the "Description of the Prior Art." Such a device consists, for example, of a silicon-doped GaAs diode containing a coating of the described composition. The coating may contain an additional ingredient or ingredients to improve adhesion and/or to reduce light scatter. In one type of device, light output is at a green wavelength of about $0.55\mu$ and apparent brightness is comparable to that of the best BaP diodes.

The novel compositions of this invention may easily be grown as large, single crystals of a high degree of perfection. This, in turn, suggests a different class of devices foremost of which is a form of solid-state laser. This laser is desirably optically pumped by a narrow light source such as the GaAs diode and emits at a characteristic wavelength for the phosphor. One such wavelength, as has been noted, is in the green. Since the laser is a three-level device of the type II category at room temperature, or, at low temperature, a four-level laser, it is in a class within which CW operation is permitted.

DETAILED DESCRIPTION

1. Drawing

Figure 1:
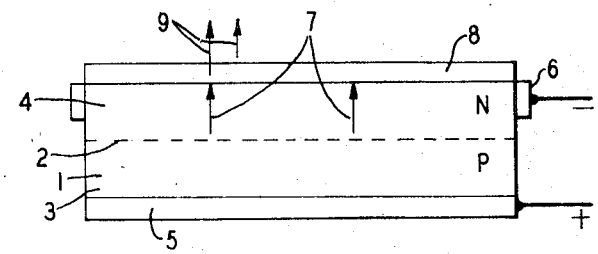
FIG. 1 is a front elevation view of an infrared-emitting diode provided with a phosphor conversion portion in accordance with the invention.

Referring again to FIG. 1, gallium arsenide diode 1 containing PN junction 2, defined by P and N regions 3 and 4, respectively, is forward biased by planar anode 5 and ring cathode 6 connected to power supply not shown. Infrared radiation is produced by junction 2 under forward-bias conditions, and some of this radiation, represented by arrows 7, passes into and through layer 8 of a phosphorescent material in accordance with the invention. Under these conditions, some part of radiation 7 is absorbed within layer 8, and a major portion of that absorbed participates in a two-photon or higher order photon process to produce radiation at a visible wavelength/s. The portion of this reradiation which escapes is represented by arrows 9.

Figure 2:
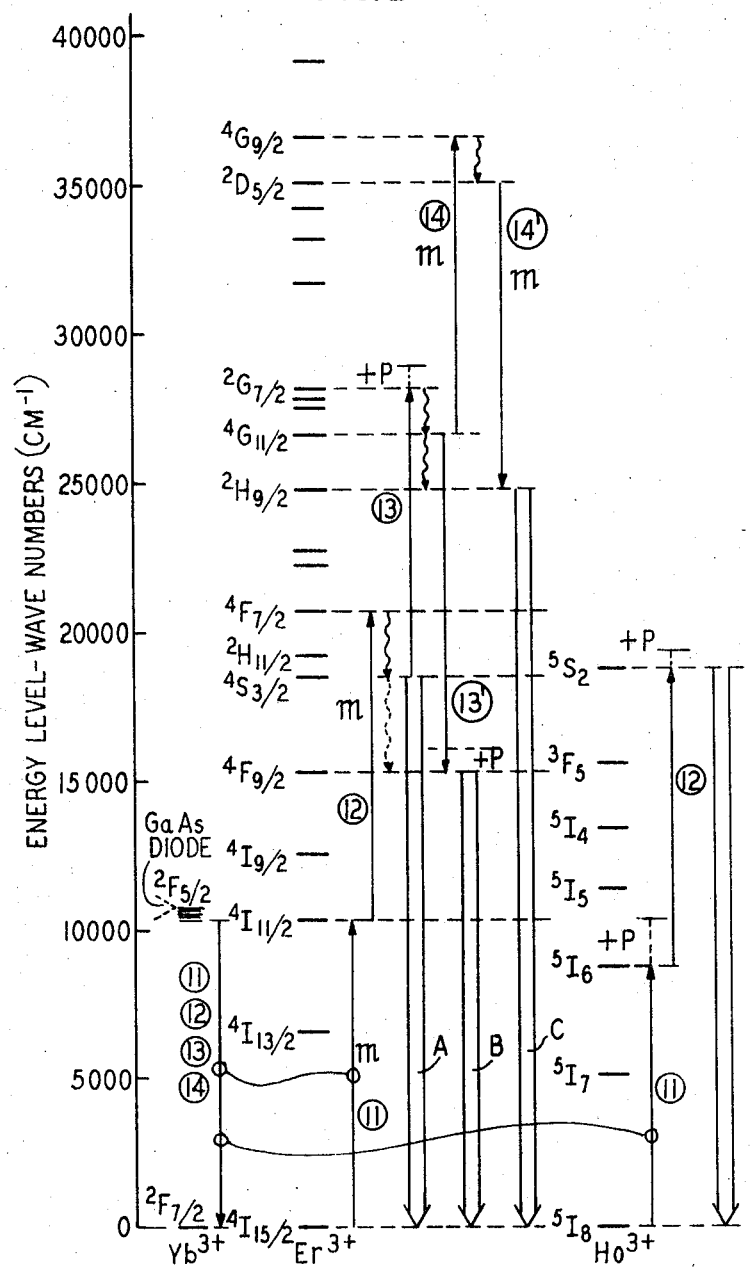
FIG. 2 is an energy level diagram in ordinate units of wave numbers for the ions $Yb^{3+}$, $Er^{3+}$ and $Ho^{3+}$ representative of the energy levels observed within crystallographic environments of compositions herein.

The main advantage of the defined phosphors is best described in terms of the energy-level diagram of FIG. 2. This energy-level diagram is a valuable aid in the description of the invention. However, while the detailed energy-level description was determined on the basis of carefully conducted absorption and emission studies, some of the information contained in the figure represents only one tentative conclusion. In particular, the excitation routes for the 3 and 4 photon processes are not established although it is clear that certain of the observed emission represents a multiple photon process in excess of doubling. The diagram is sufficient for its purpose; that is, it does describe the common advantages of the included host materials and, more generally, of the included phosphors in terminology used by quantum physicists.

While the pair $Yb^{3+}$-$Er^{3+}$ is, to date, the most efficient for up-conversion, the pair $Yb^{3+}$-$Ho^{3+}$ may also produce appreciable emission. The latter pair results in emission only in the green, at a wavelength of about 5,400 A. Unlike $Yb^{3+}$-$Er^{3+}$ which, under certain circumstances may emit at a red wavelength, there is no higher order photon addition process yielding perceptible output. This fact suggests the possibility that the two activator ions may be used together in a single composition to intensify green emission or to otherwise tailor the apparent color output to some desired value.

The ordinate units are in wavelengths per centimeter ($cm.^{11}$). These units may be converted to wavelength in angstrom units (A) or microns ($\mu$) in accordance with the relationship:

Wavelength = ($10^8$/Wave number)A=($10^4$/Wave numbers)$\mu$.

The left-hand portion of the diagram is concerned with the relevant manifolds of $Yb^{3+}$ in a host of the invention. Absorption in $Yb^{3+}$ results in an energy increase from the ground manifold $^2F_{7/2}$ to the $^2F_{5/2}$ manifold. This absorption defines a band which includes levels in the range 9,800—10,800 cm.[11].

The remainder of FIG. 2 is discussed in conjunction with the postulated excitation mechanism. All energy level values and all relaxations indicated on the figure have been experimentally verified.

2. Postulated Excitation Mechanisms

Following absorption by $Yb^{3+}$ of emission from the GaAs diode, a quantum is yielded to the emitting ion $Er^{3+}$ (or as also discussed in conjunction with the figure, to $Ho^{3+}$). The first transition is denoted 11. Excitation of $Er^{3+}$ to the $^4I_{11/2}$ level is almost exactly matched in energy (denoted by $m$) to the relaxation transition of $Yb^{3+}$. However, a similar transfer, resulting in excitation of $Ho^{3+}$ to $Ho^5I_6$ or $Tm^{3+}$ to $Tm^3H_5$, requires a simultaneous release of one or more phonons (+P). The Er manifold $^4I_{11/2}$ has a substantial lifetime, and transfer of a second quantum from $Yb^{3+}$ promotes transition 12 to the $Er^4F_{7/2}$ manifold. Transfer of a second quantum to $Ho^{3+}$ results in excitation to $Ho^5S_2$. Internal relaxation is represented on this figure by the wavy arrow $\zeta$. In erbium, the second photon level ($^5F_{7/2}$) has a lifetime which is very short due to the presence of close, lower lying levels which results in rapid degradation to the $^4S_{3/2}$ state through the generation of phonons.

The first significant emission of $Er^{3+}$ is from the $^4S_{3/2}$ state (18,200 cm.[11] or $0.55\mu$ in the green). This emission is denoted in the figure by the broad (double line) arrow A. The reverse of the second photon excitation, the nonradiative transfer of a quantum from $^4F_{7/2}$ back to $Yb^{3+}$ must compete with the rapid phonon relaxation to $Er^4S_{3/2}$ and is not limiting. The phonon relaxation to $Er^4F_{9/2}$ also competes with emission A and contributes to emission from $^4F_{9/2}$. The extent to which this further relaxation is significant is composition-dependent. The overall considerations as to the relationship between the predominant emissions and composition are discussed under the heading "Composition."

Green emission A at a wavelength of about $0.55\mu$ corresponds to that which has been observed for Er in $LaF_3$. In accordance with this invention, it is postulated that the observed high conversion efficiency is due, in large part, to the observed long lifetime of the $Er^4I_{11/2}$ excitation level. Appreciable lifetime increases the likelihood of a second photon transition to the $^4F_{7/2}$ level from which green emission (A) eventually results. That this lifetime is appreciable in the novel compositions of the invention has been directly observed. A detailed explanation as to how this lifetime is dependent upon these compositions has now been developed. Presumably the same structure or composition-dependence giving rise to this long lifetime is responsible for the efficient up-conversion also of the partial third photon process to erbium red, and also, by second photon process, to holmium green.

It is clear that efficient up-conversion is not exclusively attributable to such appreciable intermediate lifetime state. Other responsible factors include lifetimes at higher order excited states such as $^4S_{3/2}$ and $^4F_{9/2}$ in erbium as well as $^5S_2$ in holmium, and also the relative probabilities of the various types of radiationless transitions competing with the radiative transistions.

Erbium emission B is, in part, brought about by transfer of a third quantum from $Yb^{3+}$ to $Er^{3+}$ which excites the ion from $Er^4S_{3/2}$ to $Er^2G_{7/2}$ with simultaneous generation of a phonon (transition 13). This is followed by internal relaxation to $Er^4G_{11/2}$ which, in turn, permits relaxation to $Er^4F_{9/2}$ by transfer of a quantum back to $Yb^{3+}$ with the simultaneous generation of a phonon (transition 13'). The $Er^4F_{9/2}$ level is thereby populated by at least two distinct mechanisms and indeed experimental confirmation arises from the finding that emission B is dependent on the power of the input intensity which is intermediate to that characteristic of a three-photon process and that characteristic of a two-photon process for the $BaYF_5$ host. Emission B, in the red, is at about 15,250 cm.[11] or $0.66\mu$.

While emissions in the green and red are predominant, there are many other emission wavelengths of which the next strongest designated C is in the blue (24,400 cm.[11] or $0.41\mu$). This third emission originates from the $Er^2H_{9/2}$ level which is, in turn, populated by two mechanisms. In the first of these, energy is received by a phonon process from $Er^4G_{11/2}$. The other mechanism is a four-photon process in accordance with which a fourth quantum is transferred from $Yb^{3+}$ to $Er^{3+}$ exciting the ion from the $^4G_{11/2}$ level to the $^4G_{9/2}$ level (transition 14). This step is followed by internal relaxation to $Er^2D_{5/2}$ from which level energy can be transferred back to Yb about relaxation of $Er^{3+}$ to $^2H_{9/2}$ (transition 14').

Significant emission from holmium occurs only by a two-photon process. Emission is predominantly from $Ho^5S_2$ in the green (18,350 cm.[+1] or $0.54\mu$). The responsible mechanisms are clear from FIG. 2 and the foregoing discussion.

Figure 3:
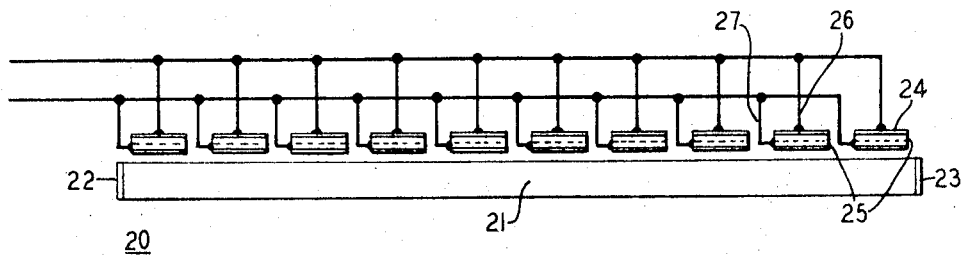
FIG. 3 is a front elevational view of an infrared diode-pumped laser, the latter constructed of a composition herein.

The device of FIG. 3 is an optically pumped, solid-state laser 20 comprising single crystal rod 21 composed of the composition herein, said rod 21 being provided with reflecting layers 22 and 23. Where laser 20 is intended to operate as an oscillator, one of the two layers, such as 22, may be completely reflecting while the other, e.g. layer 23, may be partially reflecting. As in usual optically pumped solid-state laser construction, layers 22 and 23 may be composed of a series of dielectric layers.

Rod 21 is optically pumped by light source 24. In the specific example shown, considered to represent the preferred embodiment of the laser configuration, this light source is made up of one or more infrared-emitting diodes 25. Each of these diodes may resemble that shown in detail in FIG. 1 and each is accordingly provided with electrode connections 26 and 27 connected to source not shown for forward biasing to the emitting condition. The particular arrangement of FIG. 3 is merely exemplary. An optimized structure may, for example, utilize an enveloping tube, in a cross section of which the junction defines one of a series of circles concentrically disposed both about the rod 21 and within that defining the physical bounds of the tubular structure. Other configurations may utilize end pumping, reflectors, etc.

3. Composition

In essence, compositions of the invention may be represented by the following general formula $Ba(M_xRE_yYb_{1-x-y})_aX_{2+3a}$ in which M is at least one of the trivalent ions of yttrium, lutetium, gadolinium, cerium, scandium, lanthanum, gallium, indium and aluminum, RE is at least one of the trivalent ions of erbium and holmium, and X is at least one of the monovalent halide ions (fluorine, chlorine, bromine and iodine). In accordance with usual chemical nomenclature, the subscript designations represent numbers of ions or atoms, and the absence of a subscript number indicates unity. In other terms, while no representation is made as to the precise form of any of the included compositions (some may be compounds while others may be solid solutions of compounds), the designations used in the general formula are those ordinarily used in defining a compound.

The M ion is a diluent and does not necessarily contribute directly either to an absorption or an emission. However, under certain circumstances, its presence, both as to kind and amount, may tend to shift the apparent color output. Under other circumstances, the consequent reduction in Yb or RE may result in lessened concentration quenching. The number of M ions or the value of $x$ may vary from 0 to 0.95. The lower limit requires no explanation, the upper limit corresponds with the minimum Yb and RE content required for visible emission readily discernible to unaided human vision. A preferred range is from $x=0$ to $x=0.82$. The preferred maximum value is based on the observation that such compositions may glow at a level such as to be readily observable under ordinary room lighting conditions.

Limits on RE (activator ion $Er^{3+}$ or $Ho^{3+}$) are again based on the functional characteristic of brightness. The broad range is from $y=0.01$ to $y=0.3$ with the preferred range being defined as from $y=0.03$ to $l=0.2$. The broad and preferred minima are based on discernible output to unaided vision and ready observability under ordinary room lighting, respectively. Upper limits are based on the observation that appreciably higher amounts result in dropoff (above $y=0.3$) and that appreciably larger amounts result in no significant apparent further improvement ($y=0.2$).

The total content of trivalent ions (relative to one ion of $Ba^{2+}$) may be defined within several successively narrower alpha ranges. The broadest range is from 0.05 to 4. This broad range is based on the fact that exceeding either limit in appreciable amount results in a dropoff in brightness. The minimum value is based simply on the need for sufficient sensitizer and activator ions to produce emission. A preferred range lies between $\alpha=0.4$ and $\alpha=3$. The basis for these limits is, in principle, approximately the same as expressed for the broad limits above; it being noted that little observable change in brightness occurs between the two ranges, i.e. between the broad and preferred minima and/or between the broad and preferred maxima.

The next range in alpha values still more preferred for the inventive purposes is defined as from $\alpha=0.6$ to $\alpha=1.5$. The brightest specimens produced to date have all fallen within this range.

It has been observed that different members of the general formula have different crystallographic structure. A crystallographic form believed to be hexagonal occurs as the single phase at a nominal value of $\alpha=1$. While compositions outside this nominal value of $\alpha=1$ but still within the preferred range of from 0.6 to 1.5 are generally two-phase as the extremities are approached, some of the preferred structural form, presumably hexagonal remains. Improved results are tentatively associated with the retention of some of this phase.

It follows from the above that the ideal composition occurs for the approximate alpha value of unity. For these purposes, this uniquely preferred composition is defined as lying within the range of $\alpha=1\pm10$ percent.

It has been observed that when the alpha value is appreciably less than unity, trivalent ions such as any of the alpha ions may be charge-compensated by interstitial fluorine. To the extent that such interstitial compensation is by fluorine, the general formula remains approximately correct, keeping in mind that as many as a number of fluorine ions equal to alpha may be interstitial. Of course, to the extent that such compensation does not take place, some of the alpha ions go divalent. In this form, the Yb and RE ions do not contribute to the desired conversion and must be considered as contaminants.

Charge compensation may, of course, be by other means. These include the use of other interstitial ions as, for example, $Li^{1+}$ and also anion vacancies.

Other requirements are common to phosphor materials in general. Various impurities which may produce unwanted absorption or which may otherwise "poison" the inventive systems are to be avoided. As a general premise, maintaining the compositions at a purity level resulting from use of starting ingredients which are three nines pure (99.9 percent) is adequate. Further improvement, however, results from further increase in purity, at least to the five nines level.

4. Material Preparation

Workable phosphors may be prepared by any ceramic-forming procedure in which initial ingredients which yield the final composition are intimately mixed and fired. As in the formation of other ceramic compositions, there may be an intermediate calcining step carried out at sufficient temperature to bring about reaction followed by pulverizing as in a vibratory mill and finally by final firing.

Powders however produced may be utilized in a variety of forms. If they are to be used as a coating, they may be admixed with a matrix material such as a glass to bring about adhesion to a substrate and to reduce scattering loss. For these purposes, the matrix material should have no significant absorptions within a small number of phonons of any of the relevant phosphor levels and should have a refractive index approaching that of the phosphor. Phosphors of this invention typically have refractive indices of about 1.7. Since the matrix material in no way aids energy conversion, its content is kept to the minimum sufficient for the outlined purposes.

It has been found that improvement in brightness results from purification. Since purification results from growth procedures naturally adaptable to crystallization of these materials, such processing is generally recommended. It is, for example, found desirable to purity the starting ingredient, barium fluoride, whatever the source of this material. To this end, it may be placed in a graphite or platinum boat and zone refined in a hydrogen fluoride atmosphere by one or more passes at from 1 to 10 cm. per hour through a single heater. Most of the contaminates have a distribution coefficient numerically less than one and are concentrated in the final portion to freeze. The rod is cropped to remove this contaminated (and usually discolored) section.

The zone refining procedure is but one technique for removing impurities such as water and products of hydrolysis such as barium oxide, barium hydroxide, and barium oxyfluoride, Such products, if permitted to remain, result in inhomogeneities and, consequently, in light scattering in the final crystal. Alternate techniques include removal of moisture at room temperature in a vacuum.

All procedures in which the barium fluoride of the final composition is heated to temperatures of 100° C. or above require exclusion of moisture and oxygen. Most of the described work was carried out in HF or in an inert atmosphere of nitrogen or helium.

At the termination of the zone refining step, the barium fluoride appears as a water-white crystalline mass which may or may not be single crystal.

In the $BaF_2 \cdot RF_3$ system, the $RF_3$ is discussed in terms of ytterbium trifluoride, $YbF_3$. The compound is prepared by reacting the oxide, $Yb_2O_3$, with hydrogen fluoride at elevated temperatures.

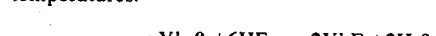

$$Yb_2O_3 + 6HF \rightarrow 2YbF_3 + 3H_2O$$

The reaction is carried out in a graphite boat within a platinum tube. Boat and contents are maintained at a temperature and for a period sufficient to being about the diffusion-limited reaction. For the quantities actually used, it took one day to reach completion. The final reacted product appears as a white powder which is finally melted at a temperature of 1160° C. The solid mass so produced is removed from the boat.

The $YbF_3$ is broken up, the stoichiometric-indicated amount is weighed out, and this is intimately mixed with the crystalline barium fluoride. Boat and contents, again, in an inert atmosphere of nitrogen or helium or HF, are passed through a zone melter, first at a relatively rapid rate of several centimeters per hour to insure homogeneity and, subsequently, at a sufficiently slow rate to produce the desired crystalline perfection (a rate of about 0 cm. per hour has been found appropriate).

While the materials may be initially prepared by a Bridgman technique, this process was found most useful as a terminal process for crystals prepared by zone melting as described above. To this end, such zone melted $BaF_2 \cdot RF_3$ is broken up and is inserted in a Bridgman crucible made of platinum or graphite. Bridgman crucibles are tapered at their lower extremities, the function of such pointed end being to nucleate single crystal growth. The tapered crucible is sealed in a heavy platinum crucible of approximately the same shape in an inert atmosphere or in a vacuum.

Crucible and contents are melted at about 950° and are recrystallized from the tapered end upward at approximately 1 mm. per hour. After crystallization and before removal, the crystal and material are annealed to relieve strain. During this period, the crystal is maintained at a temperature within about 200° C of the melting point for several hours subsequent to which it is slowly cooled to room temperature (a rate of about 25° per hour is suitable).

Certain of the inventive embodiments desirable utilize single crystals. This form has been discussed in connection with laser applications in conjunction with FIG. 3. Single crystals may also be usefully incorporated as a conversion layer machined to appropriate size and configuration for use with a diode. Crystallization to a large product of high perfection may proceed by any of several methods.

Final growth by a Bridgman technique has resulted in single crystal dimensions of the order of 1 inch in diameter and 2½ inch in length. Single crystals of the order of ½"×½"×4"can be made using a horizontal zone method. Still larger crystals may be grown by using larger vessels. The crystals are generally defect-free. The crystals containing low Er or Ho concentrations are water white while the higher Er or Ho containing crystals show a slight coloration (Er-pink, Ho-yellow). The crystals are hard and insoluble in water and may be optically polished. Composition and structure were verified by wet chemical techniques and X-ray.

5. Examples

In the following examples the general preparatory technique outlined above was followed. For comparison purposes, materials prepared in accordance with the selected examples were all produced by zone melting of powdered barium fluoride of average particle size 0.5 mm. in a graphite boat by two passes at 3 cm. per hour through a single induction heater. Under such conditions a zone length of 5 cm. resulted. Zone melting was carried out in an atmosphere of inert gas or hydrogen fluoride. The initial ingredients were all trifluorides and were prepared by reacting the oxide of the trivalent ion, e.g. $Yb_2O_3$ with hydrogen fluoride at elevated temperature, as described above. This reaction was carried out in a graphite boat within a platinum tube at temperatures of the order of 1,000° C. Reaction typically took one day to completion as indicated by gravimetric analysis and the final trifluoride product appeared as a white crystalline powder which was finally melted at a temperature of about 1,200° C. to produce a solid mass.

Zone melted $BaF_2$ and the trifluorides were next pulverized with a mortar and pestle. All ingredients were intimately mixed, were placed in a graphite boat and were zone melted in HF at a rate of several cm. per hour. Final zone melting at a rate of about 0.3 cm. per hour was carried out where a single crystalline end product was desired.

Example 1

The composition $BaY_{0.1}Yb_{0.8}Er_{0.1}F_5$ was prepared by the outlined procedure from the following ingredients:

| | |
|---|---|
| $BaF_2$ | 17.53 grams |
| $YF_3$ | 1.46 grams |
| $YbF_3$ | 18.40 grams |
| $ErF_3$ | 2.24 grams |

The composition was painted on the emitting surface of a Si doped GaAs diode which, when forward biased at 1.3 v., resulted in a brightness of 5,000 foot-lamberts. Emission was at $0.55\mu$. Luminous efficiency was about equal to that of the last reported GaP diode.

Example 2

The composition $BaYb_{0.9}Er_{0.1}F_5$ was prepared as above from the following ingredients:

| | |
|---|---|
| $BaF_2$ | 17.53 grams |
| $YbF_3$ | 20.70 grams |
| $ErF_3$ | 2.24 grams |

A coating was prepared as above. The diode was biased and emission at $0.55\mu$ resulted.

Example 3

The final composition was $BaY_{0.8}Yb_{0.1}Er_{0.1}F_5$. Ingredients were:

| | |
|---|---|
| $BaF_2$ | 17.53 grams |
| $YF_3$ | 11.68 grams |
| $YbF_3$ | 2.30 grams |
| $ErF_3$ | 2.24 grams |

A coating prepared as above glowed brightly in the green at a wavelength of $0.55\mu$ under the conditions described in example 1.

Example 4

The final composition was $BaLu_{0.5}Yb_{0.45}Er_{0.5}F_5$. Ingredients were:

| | |
|---|---|
| $BaF_2$ | 17.53 grams |
| $LuF_3$ | 11.60 grams |
| $YbF_3$ | 10.35 grams |
| $ErF_3$ | 1.12 grams |

Coating and biasing as in example 1 in emission at $0.55\mu$.

Example 5

The final composition was $BaY_{0.1}Yb_{0.8}Ho_{0.1}F_5$. Ingredients were:

| | |
|---|---|
| $BaF_2$ | 17.53 grams |
| $YF_3$ | 1.46 grams |
| $YbF_3$ | 18.40 grams |
| $HoF_3$ | 2.22 grams |

Illumination with an Si doped GaAs diode resulted in bright green emission at a wavelength of $0.54\mu$.

Example 6

The final composition was $BaY_{0.5}Yb_{0.45}Er_{0.05}Cl_5$. Ingredients were:

| | |
|---|---|
| $BaCl_2$ | 20.82 grams |
| $YCl_3$ | 9.76 grams |
| $YbCl_3$ | 12.57 grams |
| $ErCl_3$ | 1.37 grams |

Illumination with a Si-doped GaAs diode biased as above resulted in bright apparent red emission including a wavelength of $0.66\mu$.

The above examples are representative of a large series in which various compositional substitutions both in amount and kind were made. The broad formula, as well as the various ranges set forth, are based on observations made on the total series.

What I claim is:

1. Device for emitting visible light comprising a mass of the composition of matter consisting essentially of a material which may be represented by the approximate formula $\underline{Ba}(M_xRE_yYb_{1-x-y})_aX_{2-3a}$ in which M is at least one element selected from the group consisting of Y, Lu, Gd, Ce, Sc, La, Ga, In and Al, RE is at least one element selected from the group consisting of Er and Ho, X is at least one halogen, $x$ is from 0 to 0.95, $y$ is from 0.01 to 0.3 and $\alpha$ is from 0.05 to 4 together with means for irradiating said mass with infrared radiation.

2. Device of claim 1 in which RE is Er, X is F, $x$ is from 0 to 0.82, $y$ is from 0.03 to 0.2, and $\alpha$ is from 0.4 to 3.

3. Device of claim 2 in which M is Y and in which $\alpha$ is from 0.6 to 1.5.

4. Device of claim 3 in which $\alpha$ is equal to $1\pm10$ percent.

5. Device of claim 1 in which said means is at least one GaAs diode.

6. Device of claim 5 in which said mass constitutes a layer adjacent to an emitting surface of said diode.

7. Device of claim 6 in which said layer is adherent to said diode.

8. Device of claim 1 in which said mass is a single crystal.

9. Device of claim 8 in which said means constitutes at least one GaAs diode.

10. Device of claim 9 in which said crystal is of such configuration as to permit gain of electromagnetic radiation of a visible wavelength.

11. Device of claim 10 in which said crystal constitutes a Fabry-Perot cavity.